United States Patent
Nazemi

(10) Patent No.: US 10,346,961 B2
(45) Date of Patent: **\*Jul. 9, 2019**

(54) ENHANCING IMAGES

(71) Applicant: Sensors Unlimited, Inc., Princeton, NJ (US)

(72) Inventor: Jonathan Nazemi, Doylestown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,605

(22) Filed: May 24, 2018

(65) Prior Publication Data

US 2018/0276804 A1 Sep. 27, 2018

Related U.S. Application Data

(63) Continuation of application No. 15/178,888, filed on Jun. 10, 2016, now Pat. No. 10,007,974.

(51) Int. Cl.
| | |
|---|---|
| *G06K 9/00* | (2006.01) |
| *G06T 5/40* | (2006.01) |
| *G06T 5/00* | (2006.01) |
| *H04N 5/235* | (2006.01) |

(52) U.S. Cl.
CPC ............ *G06T 5/40* (2013.01); *G06T 5/009* (2013.01); *H04N 5/2355* (2013.01); *G06T 2207/20072* (2013.01); *G06T 2207/20208* (2013.01)

(58) Field of Classification Search
None
See application file for complete search history.

(56) References Cited

U.S. PATENT DOCUMENTS

| | | |
|---|---|---|
| 4,868,651 A | 9/1989 | Chou et al. |
| 5,063,607 A | 11/1991 | FitzHenry et al. |
| 6,442,294 B1 * | 8/2002 | Nishizawa ............... G06T 5/20 348/E5.073 |

(Continued)

OTHER PUBLICATIONS

Scene Generation for Tracking Small Targets Against Cloud Backgraounds, Sanders-Reed et al.,SPIE, 0277-786,2001, pp. 69-76 (Year: 2001).*

(Continued)

*Primary Examiner* — Jayesh A Patel
(74) *Attorney, Agent, or Firm* — Locke Lord LLP; Scott D. Wofsy; Joshua L. Jones

(57) ABSTRACT

A method of enhancing an image includes constructing an input histogram corresponding to an input image received at a focal plane array, the input histogram representing a pixel intensity distribution corresponding to the input image and performing an analytical operation on the input histogram to produce a modified cumulative distribution, wherein the analytical operation is a function of camera temperature. The input image is transformed using the modified cumulative distribution to produce an enhanced output image corresponding to the input image, wherein at least a portion of the input image is enhanced in the output image. In addition to or in lieu of the non-linear operation, the binning edges of the input histogram can be adjusted based on at least one of camera temperature and sensitivity state to construct an adjusted cumulative distribution.

3 Claims, 2 Drawing Sheets

(56) References Cited

U.S. PATENT DOCUMENTS

| | | | |
|---|---|---|---|
| 6,792,141 B2 | 9/2004 | Huniu | |
| 7,020,332 B2 * | 3/2006 | Nenonen | G06T 5/004 |
| | | | 382/169 |
| 7,149,325 B2 | 12/2006 | Pavlidis et al. | |
| 7,336,823 B2 | 2/2008 | Guldevall | |
| 7,631,026 B2 * | 12/2009 | Kanai | G06T 5/009 |
| | | | 348/671 |
| 7,796,168 B1 | 9/2010 | Kostrzewa et al. | |
| 8,077,995 B1 | 12/2011 | Terre et al. | |
| 8,218,868 B2 * | 7/2012 | Stern | G06T 5/009 |
| | | | 382/168 |
| 10,007,974 B2 * | 6/2018 | Nazemi | G06T 5/40 |
| 2006/0056688 A1 | 3/2006 | Toyoda | |
| 2006/0188246 A1 | 8/2006 | Terre et al. | |
| 2008/0166046 A1 * | 7/2008 | Koirala | G06T 5/002 |
| | | | 382/172 |
| 2010/0245608 A1 * | 9/2010 | Trudeau | G06T 5/009 |
| | | | 348/222.1 |
| 2011/0194766 A1 * | 8/2011 | Otsuki | G06T 5/008 |
| | | | 382/168 |
| 2011/0216949 A1 * | 9/2011 | Yang | G06T 7/11 |
| | | | 382/128 |
| 2013/0030799 A1 | 1/2013 | Lim et al. | |
| 2013/0147966 A1 | 6/2013 | Kostrzewa et al. | |
| 2014/0168445 A1 | 6/2014 | Hogasten et al. | |
| 2015/0187144 A1 * | 7/2015 | Roth | G06T 19/006 |
| | | | 345/633 |
| 2015/0319379 A1 | 11/2015 | Nussmeier et al. | |
| 2016/0044306 A1 | 2/2016 | Chahine et al. | |
| 2016/0156858 A1 | 6/2016 | Lee et al. | |
| 2017/0069069 A1 | 3/2017 | Winzell et al. | |

OTHER PUBLICATIONS

Belgian Office Action and Search Report dated Sep. 21, 2017, issued during the prosecution of corresponding Belgian Patent Application No. BE 2017/5411 (13 pages).

Thermal cameras and . . . a survey, Gade et al., Springer, Nov. 9, 2013, pp. 245-262.

* cited by examiner

ENHANCING IMAGES

CROSS-REFERENCE TO RELATED APPLICATIONS

This application is a continuation of U.S. patent application Ser. No. 15/178,888 filed Jun. 10, 2016, which is incorporated herein by reference in its entirety.

STATEMENT REGARDING FEDERALLY SPONSORED RESEARCH OR DEVELOPMENT

This invention was made with government support under contract numbers W15P7T-10-D-D413/0024 (P8650) and N00014-14-C-0061 awarded by the Office of Naval Research and CACI-NVESD. The government has certain rights in the invention.

BACKGROUND OF THE INVENTION

1. Field of the Invention

The present disclosure relates to image enhancement, and more particularly to image enhancements based on histogram manipulation and the like.

2. Description of Related Art

It is often desirable to enhance an image acquired by a camera or sensor to reveal additional detail in the image. For example, where images are taken in the presence of a bright light, details in shadows and in bright areas are often lost. Likewise, details are often lost in dark areas of dark images. As such, it is desirable to reveal such details without compromising overall image quality.

A number of image enhancement methods have, in the past, been developed. Examples of such methods include contrast stretching, histogram equalization, histogram projection, and plateau equalization. In contrast stretching, pixel intensity distributions are expanded ("stretched") to occupy a full range of possible values. According to this method, minimum and maximum pixel intensity values are measured (or estimated), and offset and gain correction values are applied to the pixel intensity values corresponding to each pixel in the image, so that the full range of intensity values is occupied. In histogram equalization, the pixel intensity distribution is attenuated or flattened. According to this method, an input histogram is constructed, which includes the total number of pixels corresponding to each intensity level within the image. Then, a cumulative histogram is constructed and normalized, and each pixel in the image is transformed using the normalized cumulative histogram as a look-up table (LUT). In histogram projection, a histogram is constructed, consisting of occupied and unoccupied levels. A cumulative histogram is then constructed and normalized, and each pixel in the image is transformed using the normalized cumulative histogram as a look-up table. In plateau equalization, an input histogram is constructed and clipped at a specified level or "plateau." Then, a cumulative histogram is constructed and normalized, and each pixel in the image is transformed using the normalized cumulative histogram as a look-up table.

The foregoing image enhancement methods can suffer from a number of drawbacks. For example, traditional image enhancement methods may not adequately reveal detail in specific regions of an image, such as shadows or bright areas. Rather, these methods tend to uniformly enhance an entire image, which may result in distortion of other regions of the image for the sake of enhancing a desired region of the image. Further, traditional image enhancement methods cannot be easily adapted, without manual adjustment, to enhance images in different environments (e.g., by dynamically altering enhancement characteristics in response to changes in camera sensitivity).

Such conventional methods and systems have generally been considered satisfactory for their intended purpose. However, there is still a need in the art for improved image enhancement. The present disclosure provides a solution for this need.

SUMMARY OF THE INVENTION

A method of enhancing an image includes constructing an input histogram corresponding to an input image received at a focal plane array, the input histogram representing a pixel intensity distribution corresponding to the input image. From the input histogram, a cumulative distribution is calculated. The cumulative distribution is subject to modifications intended to adjust image contrast by redistribution of the pixel values. The modifications can include applying analytical operations that can be dependent on camera temperature and/or sensitivity state. The input image is transformed using the modified cumulative distribution to produce an enhanced output image corresponding to the input image, wherein at least a portion of the input image is enhanced in the output image.

Performing an analytical operation can include calculating a power of the cumulative distribution to produce a resulting look-up table LUT. Performing an analytical operation can include multiplying the resulting cumulative distribution by a ramp function expressed as $$\text{RAMP\_NORM} = (X + ENH\_\text{RAMP})/(1 + ENH\_\text{RAMP})$$

and $$\text{RAMP\_LUT} = \text{MAX\_BIN} * \text{RAMP\_NORM},$$

with $$X = ([0: \text{MAX\_BIN}] - \text{OFFSET}(T))/(\text{CLIP}(T) - \text{OFFSET}(T)),$$

wherein
if $X<0$ then $X=0$,
if $X>1$ then $X=1$.
Where OFFSET(T) is the temperature dependent minimum input histogram level, CLIP(T) is the temperature dependent maximum input histogram level, ENH_RAMP is slope adjustment, RAMP_NORM is the normalized ramp function, RAMP_LUT is the look-up table for the ramp calculation, and MAX_BIN is the maxium value of the cumulative LUT bin.

Performing an analytical operation can include receiving camera temperature data and using the camera temperature, wherein the analytical operation is a function of camera temperature. The input image can be received from the focal plane array wherein the focal plane array is allowed to vary in temperature.

A system can include an imaging device including a focal plane array for capturing an input image. The system also includes an image enhancement module operatively connected to the imaging device to perform any of the methods disclosed herein for image enhancement. The imaging device can include a temperature sensor operatively connected to the module for providing the camera temperature.

The system can include any suitable output device for outputting the transformed or enhanced image.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
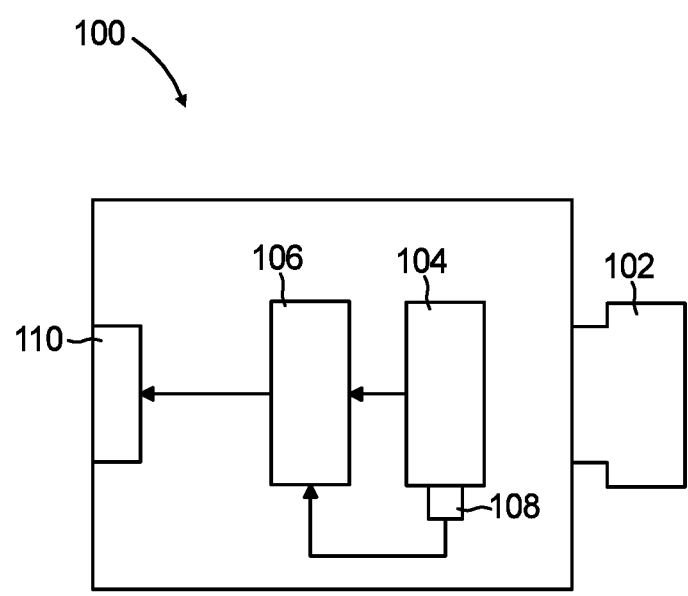
FIG. 1 is a schematic view of an exemplary embodiment of a system constructed in accordance with the present disclosure, showing an imaging device and module for enhancing images from the imaging device.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used image enhancement in non- or only partially-temperature controlled imaging systems, e.g., for use in infrared imaging. Reference is made to commonly assigned U.S. Pat. No. 8,218,868 which is incorporated by reference herein in its entirety.

System 100 includes an imaging device including optics 102 optically coupled to a focal plane array (FPA) 104 for capturing an input image. An image enhancement module 106 is operatively connected to the focal plane array 104 of the imaging device to perform any of the methods disclosed herein for image enhancement. A temperature sensor 108 is operatively connected to the module 106 for providing the camera temperature. In this example, sensor 108 is shown mounted to FPA 104 to detect the temperature of FPA 104, however those skilled in the art will readily appreciate that sensor 108 can be mounted elsewhere to determine FPA or temperature indirectly. Output device 110 is operatively connected to module 106 for outputting the transformed or enhanced images, and can include any suitable type of output device such as a display or storage device.

Figure 2:
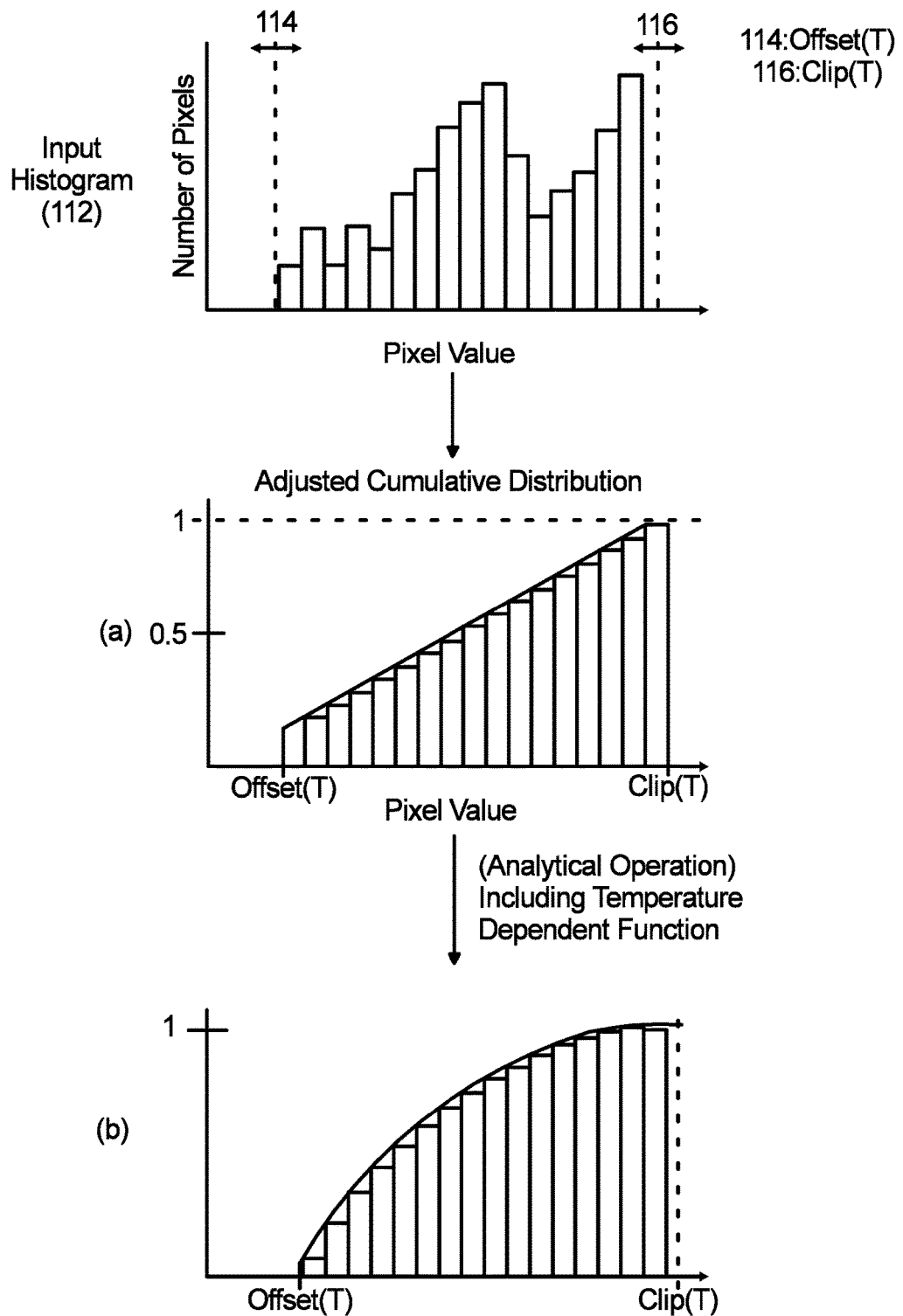
FIG. 2 is a schematic view of an exemplary histogram in accordance with the present disclosure, schematically showing temperature based adjustment of the bin edges and an analytical operation for image enhancement.

With reference now to FIG. 2, a method of enhancing an image includes constructing an input histogram 112 corresponding to an input image received at the FPA 104 of FIG. 1. The input histogram represents a pixel intensity distribution corresponding to the input image. The binning edges 114 and 116 of the input histogram are adjusted based on at least one of camera temperature and sensitivity state to construct a cumulative distribution (a). The adjustment to the binning edges 114 and 116 is indicated schematically in FIG. 2 with the double arrows. The input image is transformed using the cumulative distribution (b) to produce an enhanced output image corresponding to the input image, wherein at least a portion of the input image is enhanced in the output image. This enhanced image can issue as output from output device 110.

Adjusting the binning edges 114 and 116 can include receiving camera temperature data, e.g., from sensor 108, and using the camera temperature to adjust the binning edges 114 and 116. The method can include performing automatic gain selection and/or automatic sensitivity selection on the focal plane array 104 as a function of camera temperature utilizing the adjusted binning edges 114 and 116. The input image can be received from the focal plane array 104 wherein the focal plane array 104 is allowed to vary in temperature, i.e. the focal plane array is not temperature controlled or is only partially temperature controlled. Thus the image enhancement works in systems that have no thermoelectric cooling or the like.

Performing an analytical operation can include calculating a power of the cumulative distribution to produce a resulting LUT. Performing an analytical operation can include multiplying the resulting cumulative distribution by a ramp function expressed as $$\text{RAMP\_NORM} = (X + \text{ENH\_RAMP})/(1 + \text{ENH\_RAMP})$$

and $$\text{RAMP\_LUT} = \text{MAX\_BIN} * \text{RAMP\_NORM},$$

With $$X = ([0: \text{MAX\_BIN}] - \text{OFFSET}(T))/(\text{CLIP}(T) - \text{OFFSET}(T)),$$

wherein
if X<0 then X=0,
if X>1 then X=1.

Where OFFSET(T) is the temperature dependent minimum input histogram level, CLIP(T) is the temperature dependent maximum input histogram level, ENH_RAMP is slope adjustment, RAMP_NORM is the normalized ramp function, RAMP_LUT is the look-up table for the ramp calculation, MAX_BIN is the maximum value of the cumulative LUT bin.

Performing an analytical operation can include receiving camera temperature data, e.g., module 106 can receive the temperature data from sensor 108, and using the camera temperature, wherein the analytical operation is a function of camera temperature. As described before in the context of adjusting binning edges 114 and 116, the input image can be received from the focal plane array 104 wherein the focal plane array 104 is allowed to vary in temperature.

The method can include both an analytical operation and adjusting binning edges as described above. For example, the binning edges 114 and 116 of the input histogram 112 can be adjusted based on at least one of camera temperature and sensitivity state to construct an adjusted cumulative distribution (a), wherein performing an analytical operation on the input histogram includes performing the analytical operation on the adjusted histogram (a) to produce the modified cumulative distribution (b).

Potential benefits of the systems and methods disclosed herein include non-temperature controlled or only partial-temperature controlled imaging with image enhancements and allowing for automatic gain and sensitivity control previously only practical with temperature controlled imaging systems.

The methods and systems of the present disclosure, as described above and shown in the drawings, provide for image enhancement with superior properties including image enhancement in non- or only partially-temperature controlled imaging systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of enhancing an image comprising:
constructing an input histogram corresponding to an input image received at a focal plane array, the input histogram representing a pixel intensity distribution corresponding to the input image;
performing an analytical operation on the input histogram to produce a modified histogram, wherein the analytical operation is a function of camera temperature;
transforming the input image using a cumulative distribution of the modified histogram to produce an enhanced output image corresponding to the input image, wherein at least a portion of the input image is enhanced in the output image, wherein performing the analytical operation includes calculating a power of the input histogram to produce a resulting histogram, wherein performing the analytical operation includes multiplying the resulting histogram by a ramp function in a non-linear operation, wherein performing the analytical operation includes receiving camera temperature data and using the camera temperature, wherein the non-linear operation is a function of camera temperature; and
receiving the input image from the focal plane array wherein the focal plane array is allowed to vary in temperature.

2. A method as recited in claim 1, further comprising:
adjusting binning edges of the input histogram based on at least one of camera temperature and sensitivity state to construct an adjusted histogram, wherein performing an analytical operation on the input histogram includes performing the analytical operation on the adjusted histogram to produce the modified histogram.

3. A method as recited in claim 2, wherein adjusting the binning edges includes receiving camera temperature data and using the camera temperature to adjust the binning edges.

* * * * *